United States Patent [19]

Grob

[11] 4,440,209

[45] Apr. 3, 1984

[54] SPLIT RIM WITH AXIALLY LOCATED SPLIT BAND

[75] Inventor: Robert J. Grob, Peoria, Ill.

[73] Assignee: Caterpillar Tractor Co., Peoria, Ill.

[21] Appl. No.: 399,627

[22] Filed: Jul. 19, 1982

[51] Int. Cl.³ ............................................... B60C 5/12
[52] U.S. Cl. ..................................... 152/397; 152/399; 152/404; 152/400
[58] Field of Search ............... 152/352 R, 354 R, 377, 152/381.5, 381.6, 393, 396, 400, 403, 404, 397, 399

[56] References Cited

U.S. PATENT DOCUMENTS

| 1,343,685 | 6/1920 | Runyan | 152/400 X |
| 2,537,442 | 1/1951 | Carriker | 152/381.5 X |
| 2,848,279 | 8/1958 | Parker, Sr. | 152/404 X |
| 3,606,921 | 9/1971 | Grawey | 152/354 |
| 3,998,258 | 12/1976 | Grawey et al. | 152/405 |
| 4,228,840 | 10/1980 | Okada | 152/400 |

FOREIGN PATENT DOCUMENTS

| 2291875 | 6/1976 | France | 152/396 |
| WO82/04222 | 12/1982 | PCT Int'l Appl. | 152/393 |
| 344383 | 2/1931 | United Kingdom . | |
| 537963 | 7/1941 | United Kingdom . | |

Primary Examiner—David A. Scherbel
Attorney, Agent, or Firm—J. W. Burrows

[57] ABSTRACT

A split tire arrangement (10) for use with a closed torus tire (14), includes a first and second rim halves (11,12) each respectively having a first tapered diameter (23) and a second smaller tapered diameter (24) located on an inner side (21) of the split halves adjacent the first tapered diameter. A split band (13) is located on the second tapered diameter (24) and has a radially outwardly extending center portion (38) to locate the closed torus tire (14) relative to the split band (13) with the edges (34,36) of the split band terminating under the roll hoops (16,17) of the closed torus tire (14). This provides an arrangement for mounting the closed torus tire (14) to the split rim arrangement (10) without requiring the high forces of rubber sliding on metal.

9 Claims, 2 Drawing Figures

U.S. Patent  Apr. 3, 1984  4,440,209
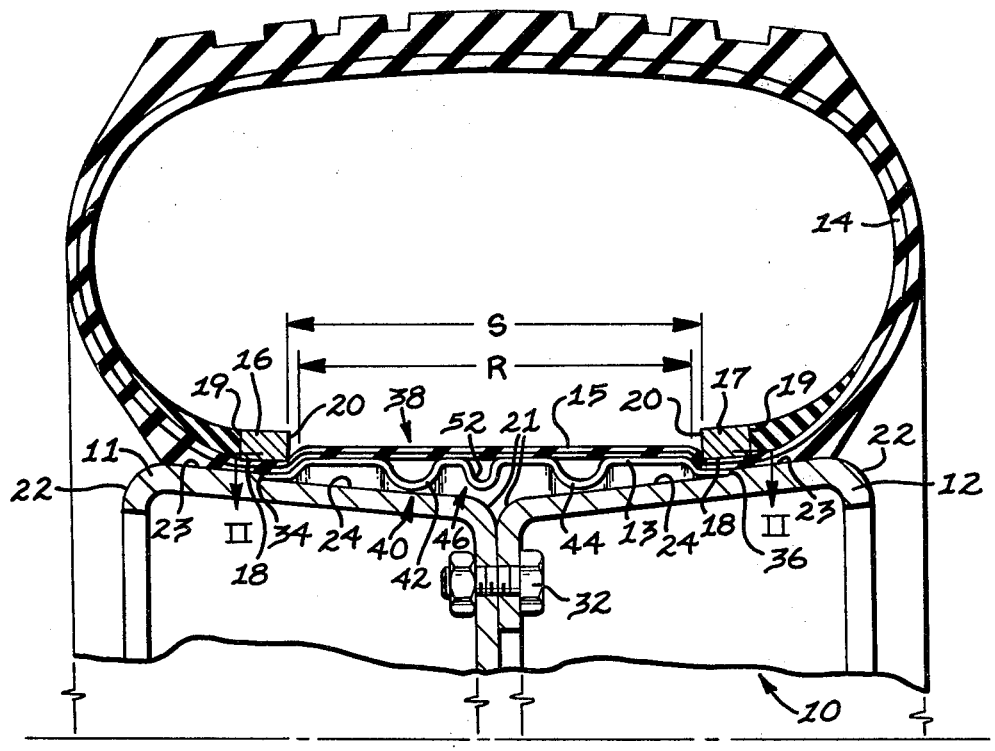
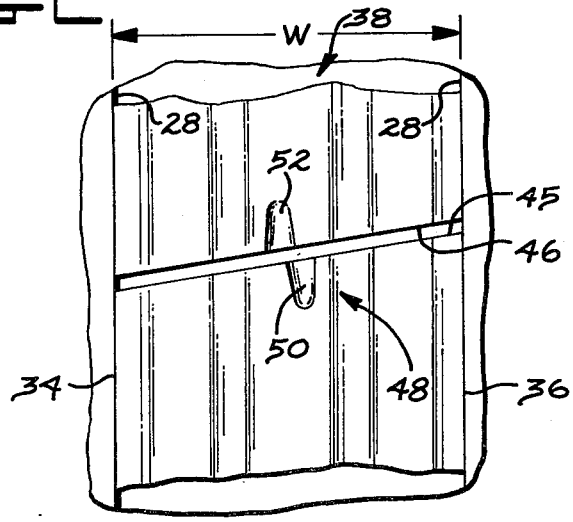

SPLIT RIM WITH AXIALLY LOCATED SPLIT BAND

Description

1. Technical Field

This invention relates generally to a split rim arrangement for use with a closed torus tire and more particularly to a split rim having a first tapered diameter adjacent the outer edge and an adjacent second smaller tapered diameter located on the periphery of each rim half for locating a split band and the roll hoops of the closed torus tire relative to the split band.

2. Background Art

Some split rims for use with closed torus tires include an angled surface on each part of the split rim for drivingly trapping the closed torus tire on the angled surfaces. These may also include a recessed portion in the rim assembly for receiving a radially inwardly projecting portion of the tire which further traps the closed torus tire in the rim halves to resist axial movement of the tire on the rim. The driving force is created by the roll hoops of the closed torus tire being forced onto the inclined surface of the rim halves and compressing the rubber between the inclined surface and the roll hoop. Others have used a split band that is located in a special recessed pocket made in the closed torus tire and held in location on the split rim by flat stepped portions which axially locates the split band and the tire on the split rim. The split band of these split rim arrangements are located in between the roll hoops of the closed torus tire.

One of the problems encountered with some of these arrangements is the force necessary to assemble the tire on the rim which has a split band and still maintain a sufficient driving force for the tire. The high forces necessary to assemble the tire on the rim results from the rubber having to be sufficiently compressed between the roll hoops and the rim to ensure a positive driving force without relying on air pressure in the tire. Consequently, special equipment utilizing hydraulic force is required to assemble the tire on the rim. Another problem with using a split band has been in providing an arrangement to position the split band and maintain the ends in abutment with one another during initial assembly.

The present invention is directed to overcoming one or more of the problems as set forth above.

DISCLOSURE OF THE INVENTION

In one aspect of the present invention a split rim arrangement for use with a closed torus tire has a transversely split band and a split rim assembly. The closed torus tire has a substantially flat tire rimwall portion at its inner diameter and first and second inextensible roll hoops mounted inside the flat rimwall portion in a spaced apart relationship. The transversely split band has first and second edges and a radially outwardly extending center portion having a width. The split band has a width greater than the space between the roll hoops of the closed torus tire while the width of the radially outwardly extending center portion is less than the space between the roll hoops. The split rim assembly includes first and second rim halves with each rim half having inner and outer edges with a first and second tapered diameter tapering axially inwardly from the outer edge toward the inner edge. The first tapered diameter and the adjacent second smaller tapered diameter are located on the periphery of each rim half. The total width of both of the second tapered diameters is substantially equal to the width of the split band. The first and second edges of the split band are located on the second tapered diameter of the split rim and located under the roll hoops of the closed torus tire. A plurality of bolts connects the first and second rim halves.

The problem of having to apply high forces to assemble a tire on a rim utilizing a split band is overcome by this concept since the split band is installed on the inside of the closed torus tire and the rim halves are then put together in a spaced apart relationship. The edges of the split band contact the inclined surfaces of the rim halves and provide a metal-to-metal sliding fit as the rim is being progressively assembled. The forces required to slide metal on metal is substantially less than that required to slide rubber on metal. Consequently, the split rim assembly provides an arrangement to ensure sufficient driving force between the closed torus tire and the rim without having to apply extremely high forces during the assembly of the split rim halves.

BRIEF DESCRIPTION OF THE DRAWINGS

FIG. 1 is a diagrammatic representation of an embodiment of the present invention; and FIG. 2 is a reduced size diagrammatic representation of the transverse ends of the split band as viewed from line II—II of FIG. 1.

BEST MODE FOR CARRYING OUT THE INVENTION

Referring now to FIGS. 1 and 2, a split rim arrangement 10 has first and second rim halves 11,12 and a transversely split band 13. A closed torus tire 14 is mounted on the split rim arrangement 10.

The closed torus tire 14 has a substantially flat tire rimwall portion 15 at its inner diameter and includes first and second inextensible roll hoops 16,17 mounted about the tire rimwall portion 15 at a spaced apart relationship "S". Each of the roll hoops 16,17 has an inner diameter 18, an axially outward side 19 and an axially inward side 20. The construction of the closed torus tire 14 can be a radial wrapped belted tire or a radial wrapped tire with an interchangeable belt as respectively shown in FIGS. 1 and 4 of U.S. Pat. No. 3,606,921 to C. E. Grawey dated Sept. 21, 1971.

The first and second rim halves 11,12 each have inner and outer sides 21,22. A first tapered diameter 23 is located on the periphery adjacent the outer side 22 and a second smaller tapered diameter 24 is located adjacent the first tapered diameter 23. The first and second tapered diameters 23,24 are tapered radially inwardly from the outer side 22 toward the inner side 21. Shoulders 28 are respectfully defined on the split rim halves 11,12 by the juncture of the first and second tapered diameters 23,24. A plurality of bolts 32 connect the first and second rim halves 11,12 in a conventional manner.

The transversely split band 13 has a width "W" with first and second edges 34,36 and a radially outwardly extending center portion 38. A width "R" of the radially outwardly extending center portion 38 is less than the space "S" between the roll hoops 16,17 of the closed torus tire 14 and the height is approximately 125% of the thickness of the tire rimwall portion 15. The split band 13 is located on the second tapered diameters 24 and the first and second edges 34,36 of the split band 13 are in abutment with the shoulders 28 of the split rim halves 11,12. The first and second edges 34,36 of the split band 13 are located under the roll hoops 16 and 17 and preferably located under the mid-point of the roll hoops 16,17. The split band 13 has a thickness substantially equal to one half of the difference between the first and second tapered diameters 23,24.

A support means 40 is provided for supporting the tire rimwall portion 15 against the first and second rim halves 11,12 when the tire 14 is inflated. The support means 40 includes first and second radially inwardly extending annular supports 42,44 extending from the radially outwardly extending center portion 38.

The split band 13 has first and second ends 45,46 and includes means 48 for permitting a greater mismatch between the first and second ends 45,46 without allowing the ends 45,46 to overlap each other. The means 48 includes first and second radially upset indentations 50,52 located respectively on the first and second ends 44,46 of the traversely split rim 13. Preferably the first and second upset indentations 50,52 are located on the same side of the split band 13 and are axially offset on the first and second ends 45,46. The width and height of the upset indentations 50,52 are preferably in the range of one to three times the thickness of the split band 13.

Preferably the split band 13 locates the closed torus tire 14 and ensures ease of assembly of the split rim halves 11 and 12 by having the first and second edges 34,36 of the split band 13 being slidably positioned on the second tapered diameters 24. The first and second edges 34,36 slide on the second tapered diameter to expand the split band 13 and compress the tire rimwall portion 15 between the split band 13 and the roll hoops 16,17. This produces the forces necessary for drivingly securing the closed torus tire 14 on the split rim arrangement 10 without requiring the use of mechanical presses to provide the high forces necessary to slide rubber on metal.

INDUSTRIAL APPLICABLILITY

During assembly of the closed torus tire 14 to the split rim arrangement 10, the split band 13 is mounted on the inside diameter of the closed torus tire 14. As the split band 13 is being expanded, the radially outwardly extending center portion 38 is automatically axially positioned between the roll hoops 16,17. The split band 13 is expanded sufficient for the first and second ends 45,46 to abut one another. The means 48 ensures that the first and second ends 45,46 remain in abutment even if the first and second ends 45,46 are not perfectly aligned one with the other. The assembly of the split band 13 to the inner diameter of the closed torus tire 14 provides up to approximately 20% compression of the tire rimwall portion 15 between the first and second edges 34,36 of the split band 13 and the respective roll hoops 16,17. Preferably the edges 34,36 of the split band 13 are located under the mid-point of the roll hoops 16 and 17. It should be noted that the first and second edges 34,36 may terminate at other locations under the roll hoop 16,17 without departing from the essence of the invention.

During assembly of the first and second rim halves 11 and 12 the first and second edges 34,36 of the split band 13 contact the second tapered diameters 24 at a location spaced from the shoulders 28 of the first and second rim halves 11 and 12. The plurality of bolts 32 are installed and progressively tightened. As the two rim halves 11 and 12 are pulled together, the first and second edges 34,36 of the split band 13 slide up the inclined surface of the second tapered diameter 24. This progressively compresses the flat tire rimwall portion 15 between the first and second edges 34,36 and the roll hoops 16,17 up to approximately 50%. As the rim halves 11,12 are being pulled together, the ends 45,46 of the split band 13 separate as shown in FIG. 2. Once the first and second rim halves 11,12 are fully drawn together and tightened, the first and second edges 34,36 are secured against the first and second shoulders 28 to ensure axial stability of the closed torus tire 14 on the split rim arrangement 10.

The width "R" of the radially outwardly extending center portion 38 relative to the space "S" between the roll hoops 16,17 establishes a space between the axially inward sides 20 of the roll hoops 16,17 and the center portion 38. The established space is less than the thickness of the tire rimwall portion 15. This ensures that the roll hoops 16,17 are properly positioned during assembly. The tire 14 will remain in its assembled position during operation in a run flat condition since the roll hoops 16,17 are held in position relative to the split band 13 and the split band 13 is held in position relative to the first and second rim halves 11,12. This is accomplished by the width "R" of the center portion 38 maintaining the space "S" between the roll hoops 16,17 and the first and second edges 34,36 of the split band 13 abutting the shoulders 28 of the first and second rim halves 11,12. Consequently, the roll hoops 16,17 will not move axially on the rim during operation in the run flat condition.

In view of the foregoing, it is readily apparent that the structure of the present invention provides an improved arrangement for assembling a closed torus tire to a split rim without having to use extremely high forces to connect the first and second rim halves of the split rim arrangement. Simple hand tools may be used to assemble the split rim arrangement and not require the use of mechanical presses.

Other aspects, objects and advantages of this invention can be obtained from a study of the drawings, disclosure and the appended claims.

I claim:

1. A split rim arrangement (10) for use with a closed torus tire (14) having a substantially flat tire rimwall portion (15) at its inner diameter and first and second inextensible roll hoops (16,17) mounted about the tire rimwall portion (15) and having a spaced (S) apart relationship, comprising:

a transversely split band (13) having first and second edges (34,36) and a radially outwardly extending center portion (38) having a width (R) less than the space (S) between the roll hoops (16,17), the split band (13) has a width (W) greater than the space (S) between the roll hoops (16,17) of the closed torus tire (14);

first and second rim halves (11,12) each having inner and outer edges (21,22), a first tapered diameter (23) adjacent the outer edge (22), a second smaller tapered diameter (24) adjacent the first tapered diameter (23), the first and second tapered diameters (23,24) being tapered inwardly from the outer edge (22) toward the inner edge (21), shoulders (28) being defined at the juncture of the first and second tapered diameters (23,24), the total width of both of the second tapered diameters (24) being substantially equal to the width (W) of the split band (13), the first and second edges (34,36) of the split band being located on the second tapered diameter (24) of the first and second rim halves (11,12) and located under the roll hoops (16,17) of the closed torus tire (14); and a plurality of bolts (32) connecting the first and second rim halves (11,12).

2. The split rim arrangement (10), as set forth in claim 1, wherein the first and second roll hoops (16,17) each have an inner diameter (18), and axially outward side (19) and an axially inward side (20), each of the first and second edges (34,36) of the split band (13) terminates under one of the roll hoops (16,17) at a location midway between the inward side (20) and the outward side (19) of the roll hoops (16,17).

3. The split rim arrangement, as set forth in claim 1, wherein the diameter of the second tapered diameter (24) at the shoulder (28) is larger than the diameter of the split band (13) and the tire rimwall portion (15) between the roll hoops (16,17) and the split band (13) is compressed up to approximately 50%.

4. The split rim arrangement (10), as set forth in claim 1, wherein the tire rimwall portion (15) has a thickness and said radially outwardly extending center portion (38) is raised approximately 125% of the tire rimwall thickness (15), said width (R) of the radially outwardly extending center portion (38) is selected to compress the tire rimwall portion (15) between the radially outwardly extending center portion (38) and the inner sides (20) of the roll hoops (16,17).

5. The split rim arrangement (10), as set forth in claim 4, wherein the radially outwardly extending center portion (38) has a radially inwardly extending support means (40) for supporting the tire rimwall portion (38) relative to the first and second rim halves (11,12) when the tire is inflated.

6. The split rim arrangement (10), as set forth in claim 4, wherein the transversely split band (13) has a thickness and first and second ends (45,46) includes means (48) for providing a larger mismatch between the first and second ends (45,46) of the transversely split band (13) without allowing overlap of the ends (45,46), said means (48) being located on at least one of the first and second ends (45,46).

7. The split rim arrangement (10), as set forth in claim 6, wherein the means (48) for providing a larger mismatch includes first and second radially upset indentations (50,52) located respectively on the first and second ends (45,46) of the transversely split rim (13).

8. The split rim arrangement (10), as set forth in claim 7, wherein the radially upset indentations (50,52) have a height, width and length, the height and width of the upset indentations (50,52) being in the range of one to three times the thickness of the split band (13).

9. The split rim arrangement (10), as set forth in claim 7, wherein the upset indentations (50,52) are radially inwardly extended and the first upset indentation (50) is axially offset relative to the second upset indentation (52).

* * * * *